(12) United States Patent
Kumar P. H. et al.

(10) Patent No.: US 12,084,834 B2
(45) Date of Patent: Sep. 10, 2024

(54) SYSTEM AND METHOD FOR OPERATING UNDERGROUND MACHINES

(71) Applicant: Caterpillar Underground Mining Pty. Ltd., South Burnie (AU)

(72) Inventors: Pradeep Kumar P. H., Porur (IN); Peter John Broughton, Kyneton (AU); Joshua Gerrit Bynon, Broadford (AU)

(73) Assignee: Caterpillar Underground Mining Pty. Ltd., Tasmania (AU)

(*) Notice: Subject to any disclaimer, the term of this patent is extended or adjusted under 35 U.S.C. 154(b) by 525 days.

(21) Appl. No.: 16/714,987

(22) Filed: Dec. 16, 2019

(65) Prior Publication Data
US 2021/0010234 A1 Jan. 14, 2021

(30) Foreign Application Priority Data

Jul. 11, 2019 (AU) ................................ 2019205002

(51) Int. Cl.
*E02F 3/43* (2006.01)
*E02F 9/20* (2006.01)
*E21F 13/00* (2006.01)
*G05D 1/00* (2006.01)
*E02F 3/28* (2006.01)

(52) U.S. Cl.
CPC .............. *E02F 9/205* (2013.01); *E02F 3/431* (2013.01); *E02F 9/2041* (2013.01); *E21F 13/00* (2013.01); *G05D 1/0088* (2013.01); *G05D 1/0212* (2013.01); *E02F 3/283* (2013.01)

(58) Field of Classification Search
CPC . E02F 3/283; E02F 3/431; E02F 3/434; E02F 9/2041; E02F 9/2045; E02F 9/205; E02F 9/262; G05D 1/0088; G05D 1/0212; G05D 2201/0202; E21F 13/00
See application file for complete search history.

(56) References Cited

U.S. PATENT DOCUMENTS

| | | |
|---|---|---|
| 2,738,222 A | 3/1956 | Needham |
| 3,643,828 A | 2/1972 | Elliott |
| 4,930,595 A * | 6/1990 | Hayward ............ G01M 3/005 340/856.1 |
| 5,116,187 A | 5/1992 | Fukuda et al. |
| 6,633,800 B1 | 10/2003 | Ward et al. |
| 6,752,467 B1 | 6/2004 | Palrose et al. |
| 7,555,855 B2 | 7/2009 | Alshaer et al. |

(Continued)

FOREIGN PATENT DOCUMENTS

CN 109072584 12/2018

*Primary Examiner* — Matthew J. Reda

(57) ABSTRACT

A method for operating an underground loader is disclosed. The method includes detecting, by a controller, a first position of the underground loader within a worksite. The method also includes determining, by the controller, a location of a dumping pit within the worksite. Further, the method includes determining, by the controller, a route for the underground loader to tram from the first position to the location of the dumping pit. Furthermore, the method includes controlling, by the controller, a movement of the underground loader along the route up to the location of the dumping pit. The method also includes moving, by the controller, an implement assembly of the underground loader based on a profile of a terrain along the route and a height of an embankment defined at an edge of the dumping pit.

20 Claims, 10 Drawing Sheets

(56) References Cited

U.S. PATENT DOCUMENTS

| | | | |
|---|---|---|---|
| 9,091,044 B2 | 7/2015 | Chi | |
| 9,747,802 B2* | 8/2017 | Fisher | B60W 30/09 |
| 10,047,495 B2 | 8/2018 | Imaizumi et al. | |
| 2005/0021195 A1* | 1/2005 | Zeitler | G05D 1/0272 |
| | | | 180/167 |
| 2010/0274488 A1* | 10/2010 | Kenney | G01V 11/00 |
| | | | 367/38 |
| 2010/0312437 A1* | 12/2010 | Saito | E02F 3/434 |
| | | | 701/50 |
| 2011/0148856 A1 | 6/2011 | Sprock et al. | |
| 2012/0053827 A1* | 3/2012 | Harada | G05D 1/0244 |
| | | | 701/301 |
| 2012/0095640 A1* | 4/2012 | Lehtinen | E02F 3/434 |
| | | | 701/25 |
| 2012/0239263 A1 | 9/2012 | Choi | |
| 2014/0081531 A1* | 3/2014 | Smith | G01S 1/68 |
| | | | 701/50 |
| 2014/0214235 A1* | 7/2014 | Kini | E02F 9/2054 |
| | | | 701/2 |
| 2015/0308070 A1* | 10/2015 | Deines | E02F 3/434 |
| | | | 701/50 |
| 2016/0123146 A1* | 5/2016 | Makela | E21B 7/025 |
| | | | 701/50 |
| 2016/0245083 A1* | 8/2016 | Rubie | E02F 3/627 |
| 2017/0220042 A1* | 8/2017 | Sakai | G05D 1/024 |
| 2018/0143625 A1 | 5/2018 | Nelson et al. | |
| 2019/0196480 A1* | 6/2019 | Taylor | G05D 1/0223 |
| 2019/0311546 A1* | 10/2019 | Tay | G06T 5/50 |
| 2020/0016619 A1* | 1/2020 | Raman | B25J 11/0075 |
| 2020/0073399 A1* | 3/2020 | Tateno | G05D 1/0088 |
| 2020/0308803 A1* | 10/2020 | Singh | E02F 3/627 |
| 2021/0222401 A1* | 7/2021 | Imaizumi | E02F 9/2246 |

* cited by examiner

SYSTEM AND METHOD FOR OPERATING UNDERGROUND MACHINES

TECHNICAL FIELD

The present disclosure relates to an underground machine for dumping a pile of material at a worksite. More particularly, the present disclosure relates to a system and method for controlling the underground machine operating at the worksite.

BACKGROUND

Earth moving machinery, such as excavators, shovel loaders, bulldozers, loaders, etc., has widespread use all aver the world for performing a variety of missions. One example is underground mining/ore extraction in which extensive dozing and/or dumping operations are required. During such an extraction process, there is a need to operate one or more earth moving machines (such as an underground loader). Usually, the underground loaders are humanly operated. A human operator drives the underground loader to an underground mining site and then controls and operates the said loader within the worksite until completion of a desired task.

Such a task, as well as other missions/tasks/operations, may be long, routine, tedious and time-consuming, preventing a human operator from maintaining a high level of performance and operation of the underground loader. In addition, the human operator may not be able to calculate the optimal operating conditions of the operating underground loader as the optimal operation depends on many parameters that the human operator may be unable to process during operation. As a result, the underground loader's quality of performance during operation may not be optimal. Furthermore, some missions/operations may be designed to be carried out, for example, with the operator on board the wheel loader, in noxious areas or in low visibility conditions, which is undesirable.

U.S. Pat. No. 3,643,828 (hereinafter referred to as U.S. Pat. No. 3,643,828) relates to an automatic control system for a front-end loader utilizing a bucket or fork at an end of a rigid boom. U.S. Pat. No. 3,643,828 teaches an automatic dumping cycle in parallel operation with a manual control system. The automatic control system may be changed to manual by an operator. U.S. Pat. No. 3,643,828 also discloses pressure sensitive means utilized to determine and control the position of various elements.

As used herein, except where the context requires otherwise the term "comprise" and variations of the term, such as "comprising", "comprises" and "comprised", are not intended to exclude other additives, components, integers or steps.

Reference to any prior art in the specification is not an acknowledgement or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In an aspect of the present disclosure, a method for operating an underground loader is disclosed. The method includes detecting, by a controller, a first position of the underground loader within a worksite. The method also includes determining, by the controller, a location of a dumping pit within the worksite. Further, the method includes determining, by the controller, a route for the underground loader to tram from the first position to the location of the dumping pit. Furthermore, the method includes controlling, by the controller, a movement of the underground loader along the route up to the location of the dumping pit. The method also includes moving, by the controller, an implement assembly of the underground loader based on a profile of a terrain along the route and a height of an embankment defined at an edge of the dumping pit.

In another aspect of the present disclosure, a control system for operating an underground loader at a worksite is disclosed. The underground loader has an implement assembly and the worksite has a terrain, a dumping pit, and an embankment defined at an edge of the dumping pit. The control system includes a positioning system configured to generate a positional data of the underground loader within the worksite and a controller communicably coupled to the positioning system. The controller is configured to detect a first position of the underground loader based on the positional data of the underground loader. The controller is further configured to determine a location of the dumping pit within the worksite. Furthermore, the controller is configured to determine a route for the underground loader to tram from the first position to the location of the dumping pit. The controller is also configured to control a movement of the underground loader along the route up to the location of the dumping pit and move the implement assembly of the underground loader based on a profile of the terrain along the route and a height of the embankment.

In yet another aspect of the present disclosure, an underground loader operating at a mining site is disclosed. The mining site has a terrain and including a dumping pit and an embankment. The embankment is defined at an edge of the dumping pit and having a height. The underground loader includes an implement assembly and a positioning system configured to generate a positional data of the underground loader within the mining site. The underground loader further includes a controller communicably coupled to the positioning system and configured to detect a first position of the underground loader based on the positional data of the underground loader, determine a location of the dumping pit within the mining site, determine a route for the underground loader to tram from the first position to the location of the dumping pit, control a movement of the underground loader along the route up to the location of the dumping pit and move the implement assembly of the underground loader based on a profile of the terrain along the route and the height of the embankment.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
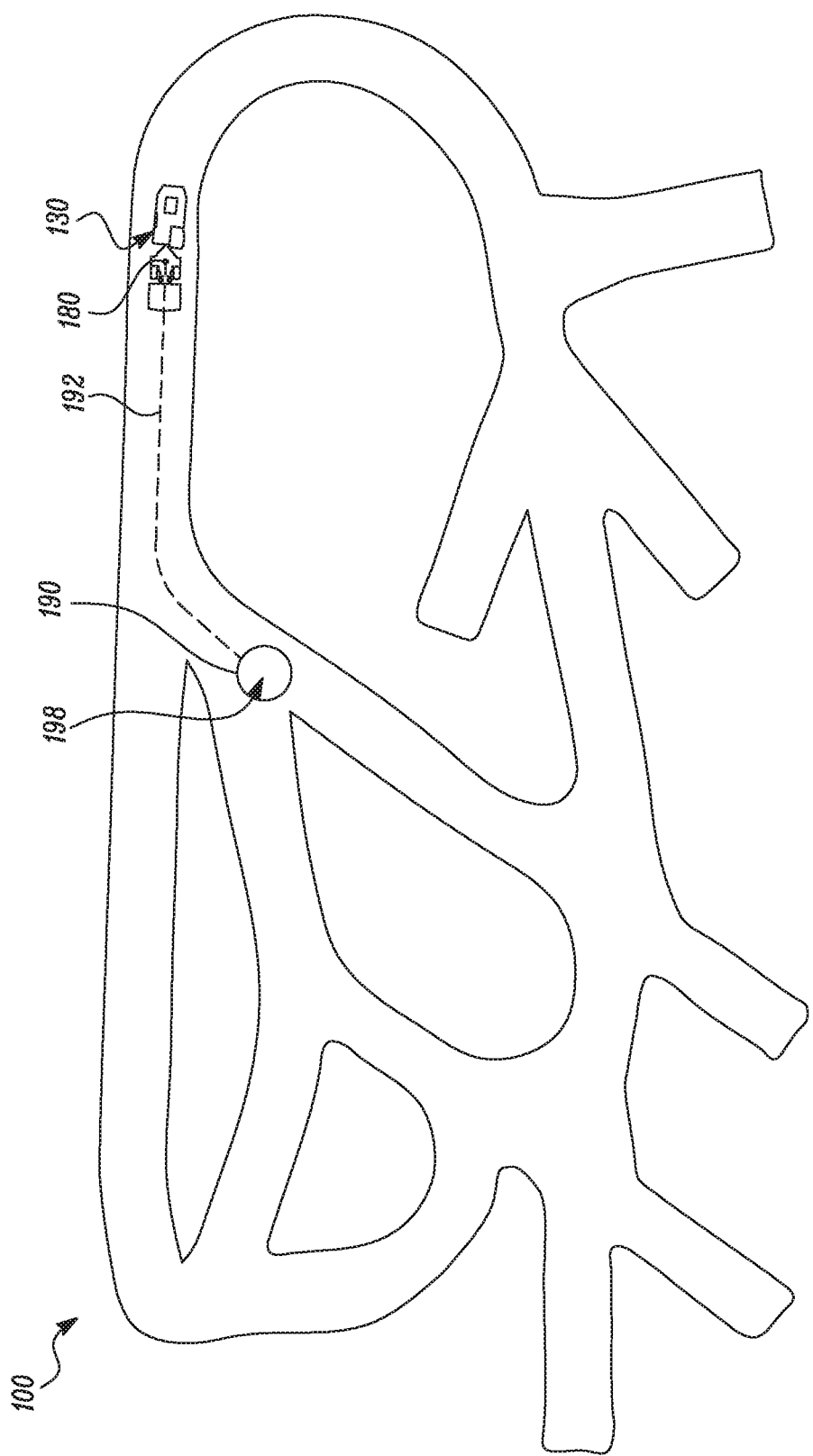
FIG. 1 is a diagrammatic illustration of a worksite, in accordance with an embodiment of the present disclosure.
Figure 2:
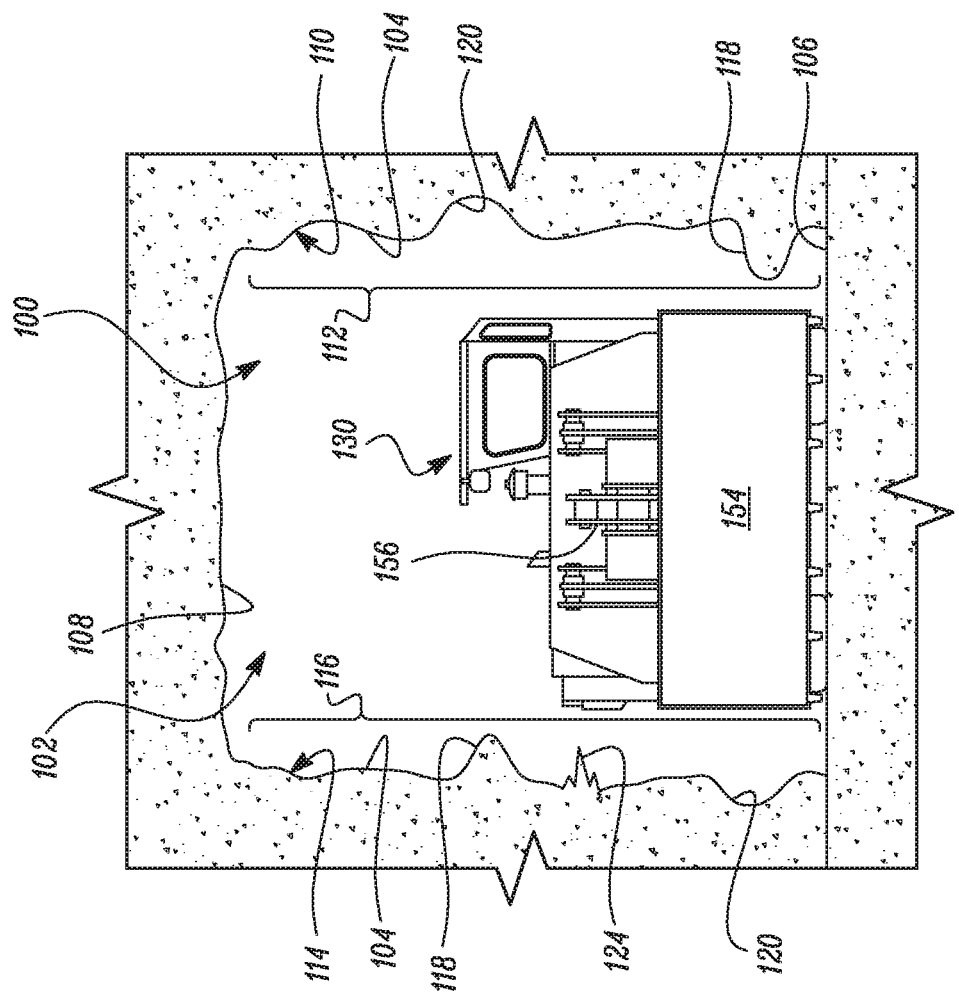
FIG. 2 illustrates a portion of the worksite having a machine operating therein, in accordance with an embodiment of the present disclosure.

Referring now to FIG. 1 and FIG. 2, an exemplary worksite 100 is illustrated. The worksite 100 is illustrated as a mine site in the illustrations. However, in various other embodiments, the worksite 100 may embody and/or include, for example, a landfill, a quarry, a construction site, or any other type of worksites. Referring to FIG. 2, a front view of a machine 130 operating at the worksite 100 is illustrated. As can be seen here, the worksite 100 includes a terrain 102 having one or more sidewalk 104, a ground surface 106 and a ceiling 108. Each of the one or more sidewalk 104, the ground surface 106 and the ceiling 108 may include a profile. In an embodiment, the profile may be defined as a 2D (2 dimensional) rendition of geometrical parameters associated with each of the one or more sidewalk 104, the ground surface 106 and the ceiling 108. In an alternate embodiment, the profile may be defined as a 3D geometry or 3-dimensional geometrical parameters associated with each of the one or more sidewalk 104, the ground surface 106 and the ceiling 108. For example, the one or more sidewalls 104 may include a first sidewall 110 having profile 112 and a second sidewall 114 having profile 116. As shown, the profiles 112 and 116 may include crest 118, trough 120 and other geometrical shape(s) 124 being defined on the sidewalls.

Figure 3:
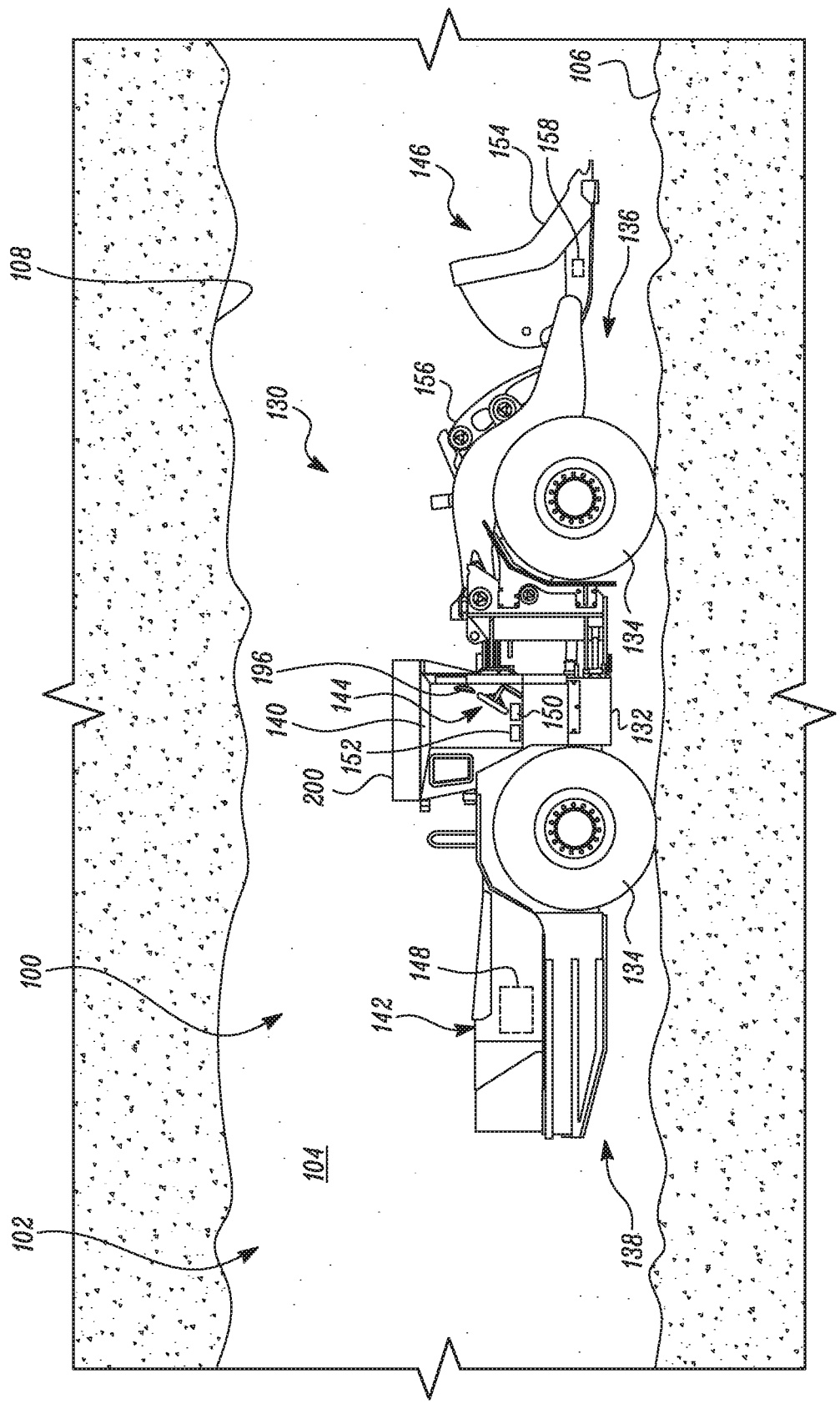
FIG. 3 illustrates a side view of the machine operating at the worksite, in accordance with an embodiment of the present disclosure.

Referring to FIG. 3, a side view of the machine 130 operating within the worksite 100 is illustrated. The machine 130 may be tasked with altering the geography at the worksite 100. The machine 130 may be a mobile machine configured to perform operations associated with industries related to mining, construction, forming, or any other industry known in the art. In the embodiment disclosed, the illustrations illustrate an underground mining load-haul-dump (LHD) loader, which may be used to access a load site in the mine site 100 (e.g. from a draw point), haul a load away from the load site, and release the load at a dumping site (e.g. at an ore pass). However, in various other embodiments, the machine 130 may embody different kinds of machine configured to perform operations such as a dozing operation, a grading operation, a leveling operation, a bulk material removal operation, or any other type of operation that results in geographical modifications within the worksite 100.

Referring to FIG. 3, the machine 130 includes a frame 132 and one or more traction assemblies (each traction assembly referred to by the reference numeral 134). The frame 132 includes a front end 136 and a rear end 138, and is configured to support various components/systems of the machine 130 such as, hut not limited to, an operator cab 140, a power producing system 142, a steering system 144, an implement assembly 146 and a transmission system (not illustrated). The operator cab 140 may be defined as an enclosure that may include one or more of electronic panels, displays, buttons, joysticks, and various other physically actuable entities. Actuations of such entities, buttons, joysticks, etc. may actuate or move the one or more systems present in the machine 130.

The power producing system 142 may include a compartment having a power source 148 in the form of an engine or an electric motor that is configured to produce torque/power to operate various systems of the machine 130. In an embodiment, the power source 148 may be a diesel engine. In various other embodiments, the power source 148 may be any engine running on solid, liquid or gaseous fuel. In the embodiment illustrated, the machine 130 includes one power source 148. However, it may be contemplated that in various other embodiments, the machine 130 may include more than one power source 148 configured to produce torque/power for operating various systems of the machine 130.

Figure 5:
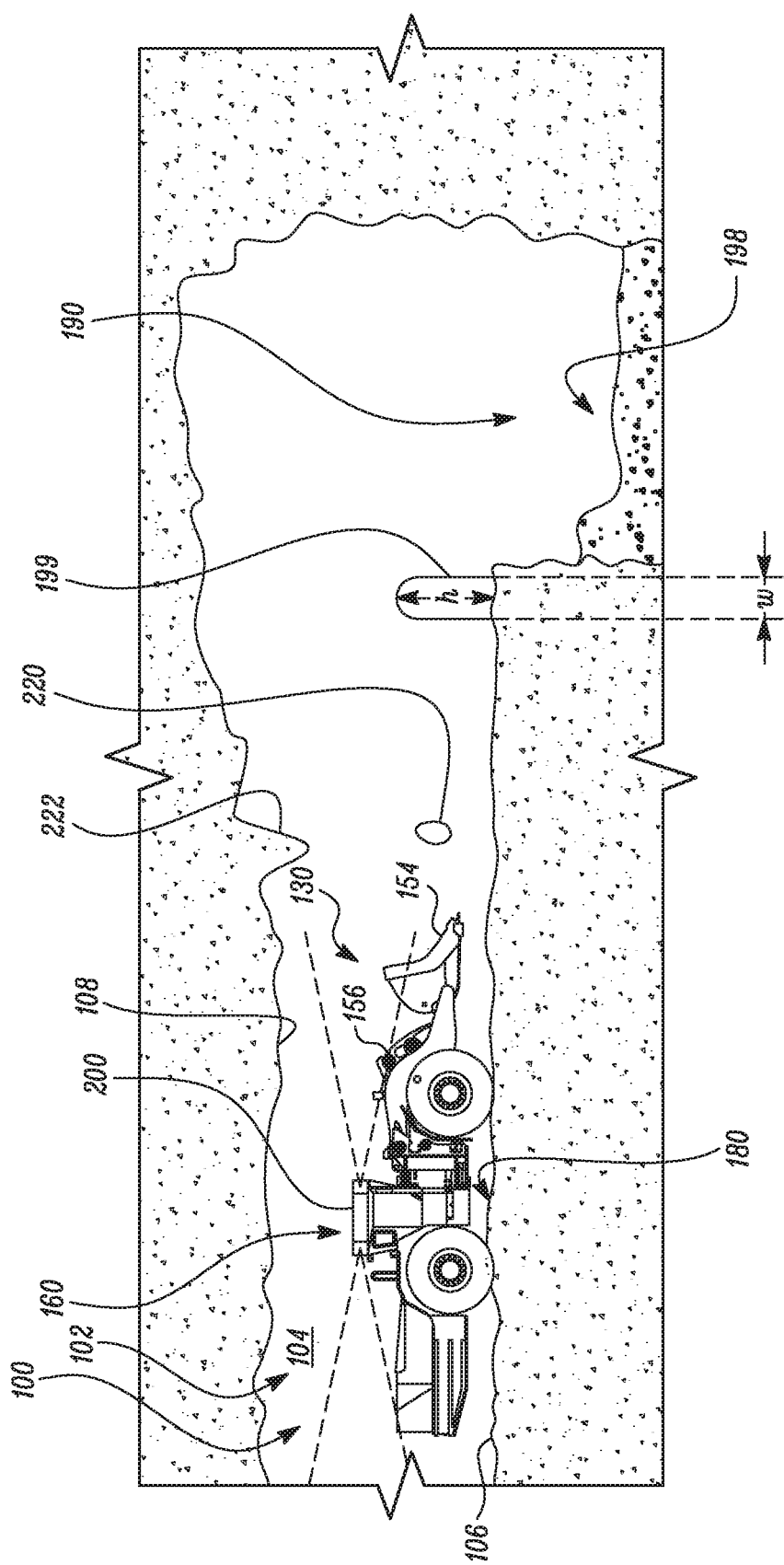
FIG. 5-FIG. 8 illustrates the control system operating the machine, in accordance with an embodiment of the present disclosure.
Figure 6:
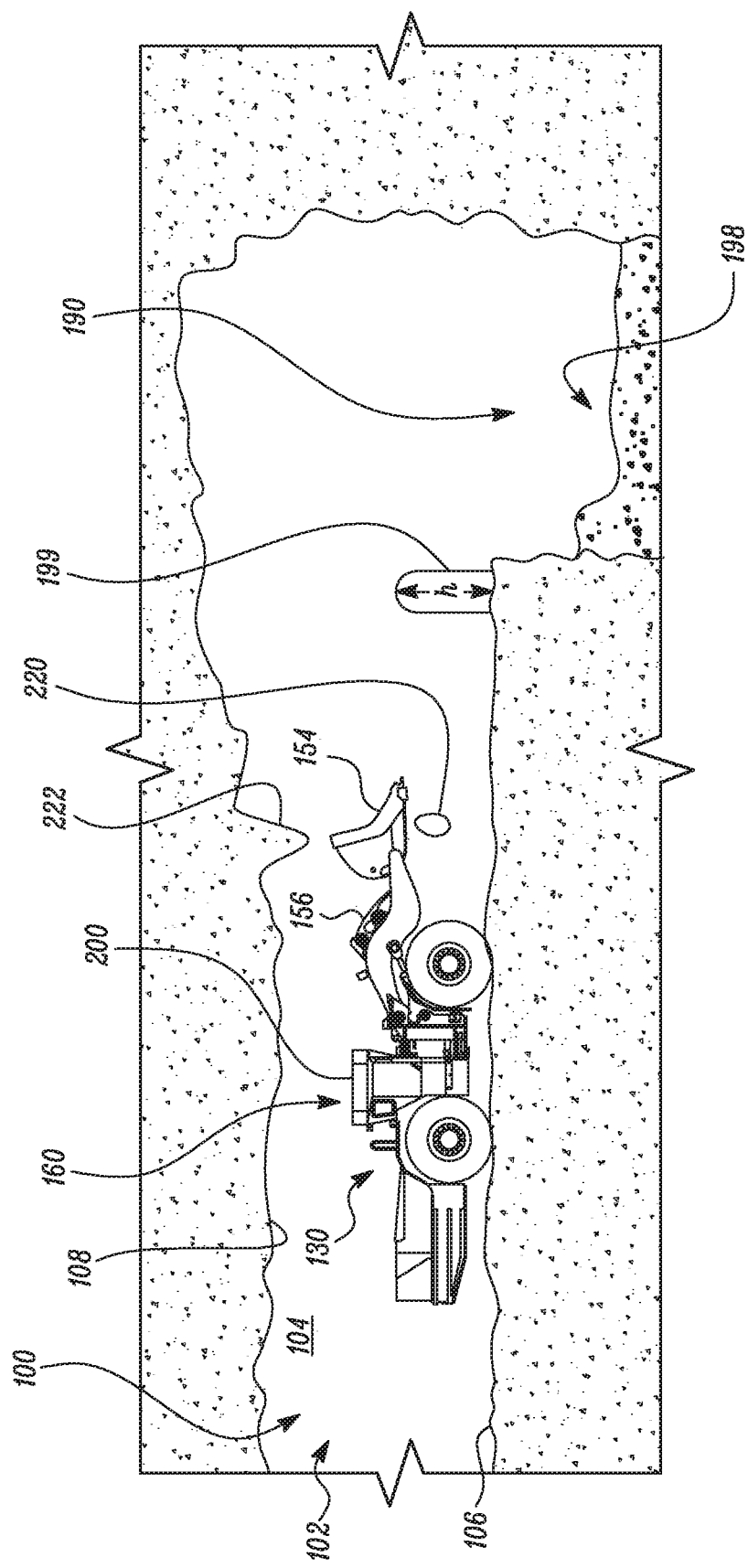

The steering system 144 may include a steering assembly (direction giving assemblies), a movement system 150 that senses the movement of the machine 130 within the worksite 100 and an orientation sensing device 152. The steering assembly may be a steering mechanism to facilitate turning of the machine 130. In the embodiment illustrated, the steering assembly is a hydraulically actuated steering system/assembly. However, in various other embodiments, the steering assembly may include one of an Ackerman steering, Bell-crank steering, rack and pinion steering, and short rack and pinion steering. It may be contemplated that in various other embodiments, the steering assembly may include other known steering assemblies/mechanisms/systems known in the art. The movement system 150 may include distance sensors such as light sensors, proximity sensors and the like. The movement system 150 may be configured to detect the distance traveled by the machine 130 while traversing from one point to another. For example, the machine 130 may travel (as shown in FIGS. 5 and 6) and the motion sensors may determine that the distance traveled by machine 130 may be 30 meters. The orientation sensing device 152 may include orientation sensors, accelerometers and gyroscopic mechanisms and maybe configured to determine the orientation of the machine 130 at a specific time instant.

The implement assembly 146 may be configured to engage with the terrain 102 (i.e. one or more sidewalk 104, ground surface 106 and ceiling 108) and perform a desired operation. For example, the implement assembly 146 may be configured to perform to one or more operations including digging/extracting, collecting and dumping material present within the worksite 100, as desired. The implement assembly 146 may include an implement 154, a linkage assembly 156 and a sensor 158. The implement 154 may be a bucket or a work tool known in the art that may be configured to engage with the terrain 102. The linkage assembly 156 may be coupled to the machine 130 and the implement 154. The linkage assembly 156 may include one or more hydraulic actuators. The actuation/movement of the one or more hydraulic actuators may facilitate movement of the implement 154 relative to the machine 130. More specifically, the linkage assembly 156 may be configured to control the movement and/or positions (including height parameters) of the implement 154 relative to the machine 130. The sensor 158 may be disposed on the implement 154 and may be configured to assist in detecting a mass of the material accumulated in the implement 154. The sensor 158 may be load cells, piezoelectric transducers, or other known weight sensors in the art.

The sensor 158 may be configured to detect the mass of the implement 154 and/or the material accumulated within the implement 154 while operating the machine 130. The sensor 158 may further be able to retrieve/receive information regarding the implement 154 such as the mass of the implement 154. Using detected mass of the implement 154 and the material accumulated within the implement 154 and the mass of the implement 154, the sensor 158 may detect the mass of the material accumulated within the implement 154 as will be readily understood by a person of ordinary skill in the art.

Figure 4:
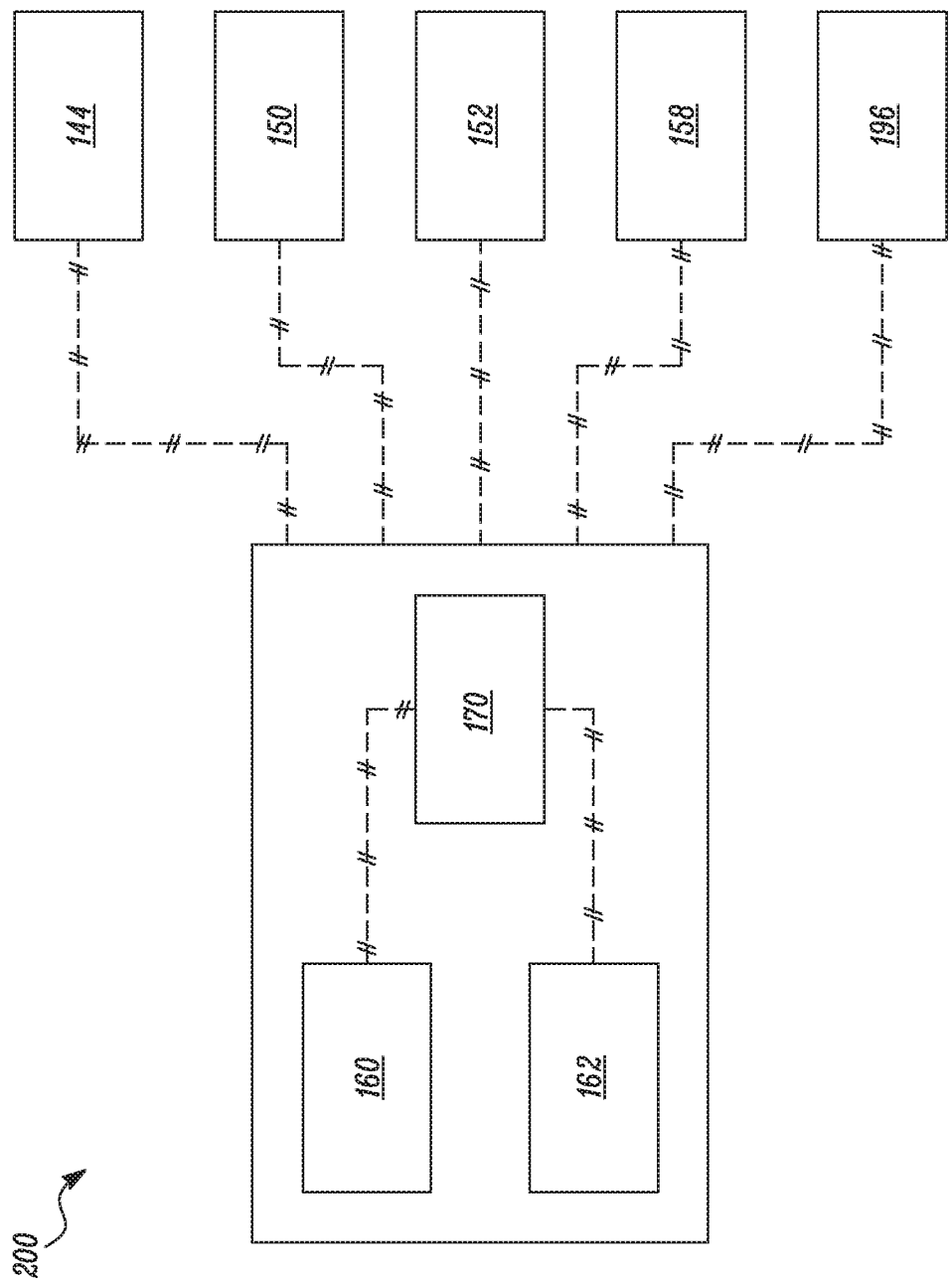
FIG. 4 illustrates a control system of the machine, in accordance with an embodiment of the present disclosure.

Referring to FIG. 3 and FIG. 4, the machine 130 includes a control system 200. The control system 200 may be configured to control various components/assemblies of the machine 130 and/or the machine 130 based on suitable logic/instructions (as will be described later in the specification). The control system 200 includes a perception system 160. The perception system 160 may include at least one perception sensor (not shown). The perception system 160 is configured to generate perception data of the worksite 100. In accordance with an embodiment, the perception system 160 may include a light detection and ranging (LIDAR) device. In accordance with alternate embodiments, the perception system 160 may include perception sensors such as RADAR (radio detection and ranging) device, a stereo camera, a monocular camera, or another device known in the art. The perception system 160 may be disposed on the machine 130. In other embodiments, at least one perception system 160 may be located on the machine 130 and at least one perception system similar to the perception system 160 may be remotely located, such as on a one or more vertical structures (pole, tower) within the worksite 100 to generate the perception data. The perception data obtained from the perception system 160 is used to determine the terrain 102 (along with profile of the terrain 102) and geometrical properties of the worksite 100. In accordance with an embodiment, the perception data generated by the perception system 160 includes a three dimensional (3D) point cloud representation of the worksite 100. The three dimensional (3D) point cloud representation of the worksite 100 may include information regarding the profile of the terrain 102 i.e. location where crest 118 exists and location where trough 120 exists, etc. In another embodiment, the perception system 160 may generate 2D images of the worksite 100 or at least a portion of the worksite 100.

The control system 200 also includes a positioning system 162. The positioning system 162 may be configured to generate a positional data of the underground loader/machine 130 within the worksite 100. The positioning system 162 may be any one of a combination of a Global Positioning System (GPS), an Inertial Navigation System, an underground worksite system (equipped with sensors for detecting the position of features and/or machine 130) or any other known position detection system known in the art.

The control system 200 further includes a controller 170. The controller 170 is communicably coupled to the steering system 144, implement assembly 146, perception system 160 and positioning system 162. Based on the data/information received from the steering system 144, implement assembly 146, perception system 160 and positioning system 162, the controller 170 may control the actuation of at least one of the one or more actuators within the linkage assembly 156, which in turn may control the position and movement of the implement 154. The controller 170 may also be configured to operate the machine 130 within the worksite 100.

It should be appreciated that the controller 170 may readily embody a general machine microprocessor capable of controlling numerous machine functions. The controller 170 may include a memory, a secondary storage device, a processor, and any other components for running an application. Various other circuits may be associated with the controller 170 such as power supply circuitry, signal conditioning circuitry, solenoid driver circuitry, and other tees of circuitry.

In an aspect of the present disclosure, the controller 170, using the data/information from the positioning system 162 and the perception system 160, may be configured to detect an initial position of the machine 130 within the worksite 100. Further, the controller 170 may determine a specific location within the worksite 100 and thereafter determine a route for the machine 130 to move from the initial position of the machine 130 to the specific location. Furthermore, the controller 170 may control a movement of the machine 130 along the route up to the specific location. Concurrently, the controller 170 may be configured to move an implement assembly 146 of the machine 130 based on a profile of the terrain 102 along the route and one or more parameters associated with the terrain proximate to the specific location. A detailed understanding of the controller's 170 capabilities will be described in detail later in the specification.

Industrial Applicability

With reference to FIGS. 5-10, an exemplary method 1000 for operating the implement 154 of the machine 130, by the controller 170 will now be discussed. The method 1000 is discussed by way of a flowchart, as provided in FIG. 10, that illustrates exemplary stages/steps (i.e., from 1002 to 1010) associated with the method 1000. Furthermore, for the purpose of understanding the ongoing disclosure, FIGS. 5-10 present a side view of the machine 130 working at the worksite 100. Accordingly, only one sidewall 104 is visible. However, it may be understood that another sidewall exists, in spite of not being disclosed in the illustrations.

Furthermore, for the purpose of ongoing disclosure, it may be assumed that the machine 130 (i.e. the underground loader) is at a position labeled '180' and a dumping pit 198 is at a position labeled '190' within the worksite 100 and the controller 170 receives a signal to actuate the method 1000 for operating the machine 130. More particularly, the controller 170 may receive the signal for starting autonomous dumping of material accumulated within the implement 154 into the dumping pit 198 via an input device (joystick, key, button, etc.) present within the operator cab 140. In an embodiment, the controller 170 may receive the signal for starting autonomous dumping of material accumulated within the implement 154 into the dumping pit 198 via a computer system, located at a remote location, being operated by an operator.

Upon receipt of such an instruction, the controller 170 detects a position 180 (hereinafter referred to as 'first position') of the machine 130 within the worksite 100 (STEP 1002). In an embodiment, the controller 170 may determine the first position 180, based on an input from the operator on the input device. For example, the machine 130 may have an input device in the form of a touch screen 196 provided within the operator cab 140. The operator inside the operator cab 140 may provide an input via the touch screen 196 to determine the first position 180. Alternatively, the operator operating the machine 130 from a remote location may communicate with the touch screen 196 via a computer and provide the input to the touch screen 196 to determine the first position 180.

In another embodiment, the controller 170 may make use of the perception system 160 and the pre-stored terrain map of the worksite 100 (within the memory of the controller 170) to determine the position of the machine 130 in the worksite 100. More specifically, the controller 170 may actuate the perception system 160 and determine the terrain 102 surrounding the machine 130. The determined terrain 102 surrounding the machine 130 may be compared with various portions of the worksite 100 (the terrain map pre-stored within the memory of the controller 170 may include the terrain maps of various portions of the worksite 100). When the determined terrain surrounding the machine 130 is same as a specific portion of the worksite 100, the controller 170 may be able to determine the position (i.e. first position 180) of the machine 130. More simply, the controller 170 may identify the position 180 of the machine 130 within the worksite 100 from where the perception system 160 (disposed on the machine 130) can determine the said terrain, as discussed above.

In another embodiment, the worksite 100 may have a plurality of position detecting sensors disposed at specific positions within the worksite 100. A map of the worksite 100 and the positions of the plurality of position detecting sensors dispersed within the worksite 100 may be pre-stored within the memory of the controller 170. The controller 170 may communicate with said plurality of position detecting sensors (may be proximity sensors) dispersed within the worksite 100 to establish the first position 180 of the machine 130 within the worksite 100 i.e. the proximity sensors may detect the distance of the machine 130 from each sensor. Collating the detected distance from each proximity sensor and the position of the proximity sensors on the worksite 100, the controller 170 may establish the first position 180, as will be readily understood by a person of ordinary skill in the art.

While only a few exemplary methods of detecting the first position 180 of the machine 130 within the worksite 100 have been disclosed, it may be contemplated that in various other embodiments different techniques/logic/instructions may be employed to detect the first position 180 of the machine 130 within the worksite 100.

The method 1000 now proceeds to STEP 1004 where the controller 170 determines the location of the dumping pit 198 to be location '190'. In an embodiment, the controller 170 may have pre-stored instructions for identifying a dumping pit 198 within the worksite 100. For example, the controller 170 may have pre-stored instructions to identify a portion of the worksite 100 as the location of the dumping pit 198 if the location/portion has a bore of a predefined diameter therein. Thus, in an embodiment, the controller 170 may determine the terrain 102 via the use of the perception system 160. On this determined terrain 102, the controller 170 may apply the said instructions to identify the dumping pit 198.

In another example, the controller 170 may display on the touch screen 196 a message, prompting the operator (whether within the operator cab 140 or at a remote location) to input the location 190 of the dumping pit 198. While two exemplary methods of determining the location 190 of the dumping pit 198 within the worksite 100 have been disclosed, it may be contemplated that in various other embodiments different techniques/logic/instructions may be employed to determine the location 190 of the dumping pit 198 within the worksite 100.

The method 1000 now moves to STEP 1006. Here, the controller 170 determines a route for the machine 130 to tram (move) from the first position 180 to the location 190 of the dumping pit 198. In an example, the controller 170 may determine a route 192 (as shown in FIG. 1) for the machine 130 to tram from the first position 180 to the location 190. The route 192 may be determined by the controller 170 such that the features of the worksite 100 such as terrain features: crests and troughs are minimized, thereby, providing a smooth traversal of the machine 130 while minimizing/preventing the risk of sudden jerk/impact of the machine 130 and/or implement 154 with surrounding terrain features and/or one or more objects. In an embodiment, the route 192 may be determined by the controller 170 such that a pre-defined distance is maintained between the machine 130 and terrain 102 (such as sidewalk 104 and ceiling 108 and associated crests and troughs) and/or one or more objects present within the worksite 100. In an embodiment, the one or more objects may include another machine (which may be an underground loader, a hauling truck, longwall shearer systems, and other known mining equipment/systems/machines).

In another embodiment, the controller 170 may determine the route 192 for the machine to tram from the first position 180 to the location 190, based on an input from the operator on the input device. The operator inside the operator cab 140 may provide an input via the touch screen 196 to determine the route 192. Alternatively, the operator operating the machine 130 from a remote location may communicate with the touch screen 196 via a computer and provide the input to the touch screen 196 to determine the route 192. While two exemplary methods of determining the route 192 have been disclosed, it may be contemplated that in various other embodiments different techniques/logic/instructions may be employed to determine the route 192.

Subsequent to the determination of the route 192 by the controller 170, the method 1000 moves to STEP 1008 i.e. the controller 170 now controls the movement of the machine 130 such that the machine 130 trams (moves) from the first position 180 to the location 190 of the dumping pit 198. More specifically, the controller 170 controls a speed at which the machine 130 moves along the route 192 and controls a direction (via steering system 144) in which the machine 130 trams.

Subsequent to STEP 1008, the method 1000 initiates STEP 1010. In said step, the controller 170 controls the movement of the implement assembly 146. More specifically, the controller 170 controls the movement of the implement assembly 146 based on the profile of the terrain 102 along the route 192. The controller 170 also controls the movement of the implement assembly 146 based on one or more parameters associated with the dumping pit 198. The one or more parameters associated with the dumping pit 198 may include a size of the bore defining the dumping pit 198, a depth of the dumping pit 198, an embankment 199 defined at an edge of the dumping pit 198 (as shown in FIGS. 1-8). The embankment 199 may include a height 'h', width 'w' and length (not shown as the length extends into the plane of the illustrations).

A detailed understanding of STEP 1010 will now be explained using exemplary scenarios. In an embodiment, STEP 1010 starts as soon as the controller 170 initiates moving the machine 130 along the route 192. In said step, the controller 170 may determine the profile of the terrain 102 along the route 192. More specifically, the controller 170 determines the profile of the terrain 102 i.e. a three-dimensional geometry of each of the one or more sidewalk 104, the ground surface 106 and the ceiling 108 proximate to the machine 130 during traversal of the machine 130 along the route 192. Using this determined data (profile) along with machine 130's dimensions pre-stored within the memory of the controller 170, the controller 170 may simulate the tramming of the machine 130 from the first position 180 to the location 190 of the dumping pit 198.

During such simulation, the controller 170 determines that implement assembly 146 may collide with a feature of the terrain 102 while the machine 130 trains along route 192. For example, referring to FIG. 6 and FIGS. 7, the controller 170 may determine that the machine 130 traversing along a portion of the ground surface 106 having an irregular profile is on course to collide with a protrusion 220 defined on the sidewall 104. The controller 170 may now compute a position of the implement 154 such that the detected simulated collision with the protrusion 220 is avoided. However, the controller 170 may be configured to compute such position of the implement 154 in a manner that collision with the ceiling 108 is prevented. For example, the controller 170 may determine that the implement 154 can be raised to its highest vertical position to avoid collision with protrusion 220. However, raising the implement 154 to the highest vertical position may cause the implement 154 to collide with the portion 222 of the ceiling 108. Accordingly, the controller 170 may compute the position of the implement 154 such that collision with the protrusion 220 is avoided while maintaining an implement clearance with the portion 222 of the ceiling 108. This ensures that collision of the implement 154 with the sidewalls 104 and ceiling is prevented during movement of the machine 130 along this portion of the ground surface 106 having the irregular profile.

In an embodiment, the controller 170 while raising the height of the implement 154 may also steer the machine 130 away from the protrusion 220 to avoid collision of the protrusion 220 with the machine 130, as will be understood by a person of ordinary skill in the art. It may be contemplated that the movement away from the protrusion 220 is not illustrated in the illustrations as the movement of the machine 130 is along a direction perpendicular to the plane of the illustrations.

In the manner described above, the controller 170 determines all the possible instances where the implement 154 may collide with the one or more sidewalls 104 along the route 192. Furthermore, the controller 170 may determine all the possible instances where the implement 154 may collide with the ground surface 106 and ceiling 108 along the route 192 (in a similar manner as disclosed above). Concurrently, the controller 170 computes positions of the implement 154 to avoid such collisions.

Let us assume that the controller 170 moves the machine 130 along a portion of the route 192 where the implement 154 may be on course to collide with the terrain 102. As the controller 170 is equipped with pre-stored instructions/logic to prevent the collisions before the machine 130 passes through portions of the route 192 where collisions are simulated, the controller 170 issues a command signal for actuating the hydraulic actuators of the linkage assembly 156. Thereby, moving the implement 154 to a position where collision with the terrain 102 is avoided. In an embodiment, the controller 170 may be further configured to move the implement 154 such that at least a predefined safe distance is maintained between the terrain 102 and the implement assembly 146 (specifically, the implement 154) during traversal of the machine 130 along the route 192.

It may be noted that the simulation described above is performed after the STEP 1008 in the embodiment illustrated. However, a person of ordinary skill in the art may be able to contemplate that in various other embodiments the simulation for detecting potential collisions and determination of positions of the implement 154 to avoid such collisions may be performed by the controller 170 before STEP 1008.

Also, it may be noted that in the embodiment disclosed, simulation has been discussed in STEP 1010. However, in various other embodiments, real-time manipulation of the implement assembly 146 may be performed by the controller 170 i.e. the controller 170 may not detect the collisions prior to the travel along the route 192. More specifically, the controller 170 may detect a possible collision scenario while the machine 130 traverses along the route 192. For example, the controller 170 may detect one or more objects such as one or more machines while the machine 130 traverses along the route 192. In case a distance between the machine 130 and the machine detected by the perception system 160 is such that a collision situation arises, the controller 170 controls the movement of the implement assembly 146 based on the position of the detected machine.

In an aspect of the present disclosure, STEP 1010 may further include the controller 170 determining a position of the embankment 199 within the worksite 100 and the height 'h' of the embankment 199 prior to the machine 130 reaching the location 190 of the dumping pit 198. The controller 170 may have pre-stored instructions/logic in the memory for determining the position of the embankment 199 and the height 'h' of the embankment 199. For example, the controller 170 may have pre-stored instructions for actuating the perception system 160 to determine the three-dimensional geometrical parameters of the terrain 102 surrounding the dumping pit 198. Using these instructions, the controller 170 may determine the embankment 199 and height 'h' prior to the machine 130 reaching the location 190. For example, the controller 170 may have instructions (pre-stored) to identify a portion of the terrain 102 at the edge of the dumping pit 198 as an embankment 199 if the height of the portion at the edge of the dumping pit 198 exceeds a predefined threshold value.

Alternatively, the operator may provide an input via the touch screen 196 to determine the position of the embankment 199 and height 'h'. Alternatively, the operator operating the machine 130 from a remote location may communicate with the touch screen 196 via a computer and provide the input to the touch screen 196 to determine the embankment 199 and height 'h'. While said exemplary methods of determining the embankment 199 and height 'h' have been disclosed, it may be contemplated that in various other embodiments different techniques/logic/instructions may be employed.

After detecting embankment 199, the controller 170 determines a position the implement 154 should undertake (based on the height 'h') as the machine 130 approaches/reaches the location 190 (to prevent the implement 154 from colliding with the embankment 199). Using this information, the controller 170 controls the linkage assembly 156 to move the implement 154 to the determined position as the machine 130 approaches the location 190, thereby, preventing the implement 154 from colliding with the embankment 199, as shown in FIG. 7.

Figure 7A:
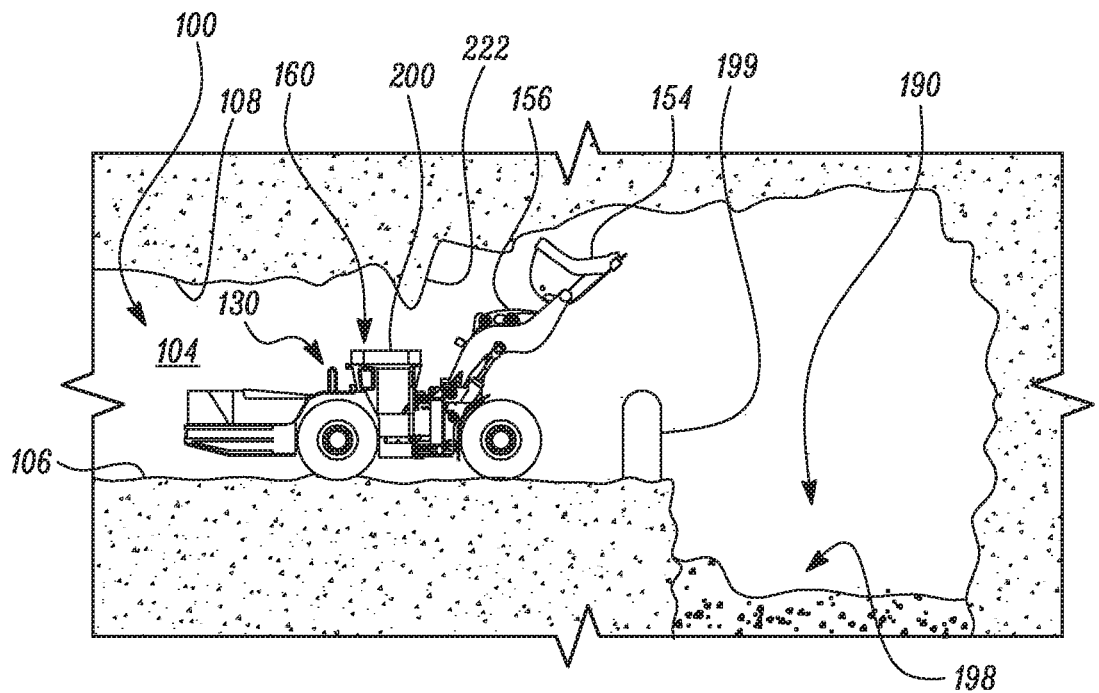

In an embodiment, the controller 170 may be configured to stop the machine 130 at a predefined clearance from the embankment 199, as shown in FIG. 7. More specifically, the controller 170 may have pre-stored instructions to communicate with a sensor (such as a proximity sensor disposed on the machine 130) or the perception system 160 to determine the distance between the embankment 199 and the machine 130. When the determined distance between the embankment 199 and the machine 130 is equal the predefined clearance (pre-stored within the memory of controller 170), the controller 170 issues a command to halt the machine 130.

Figure 8:
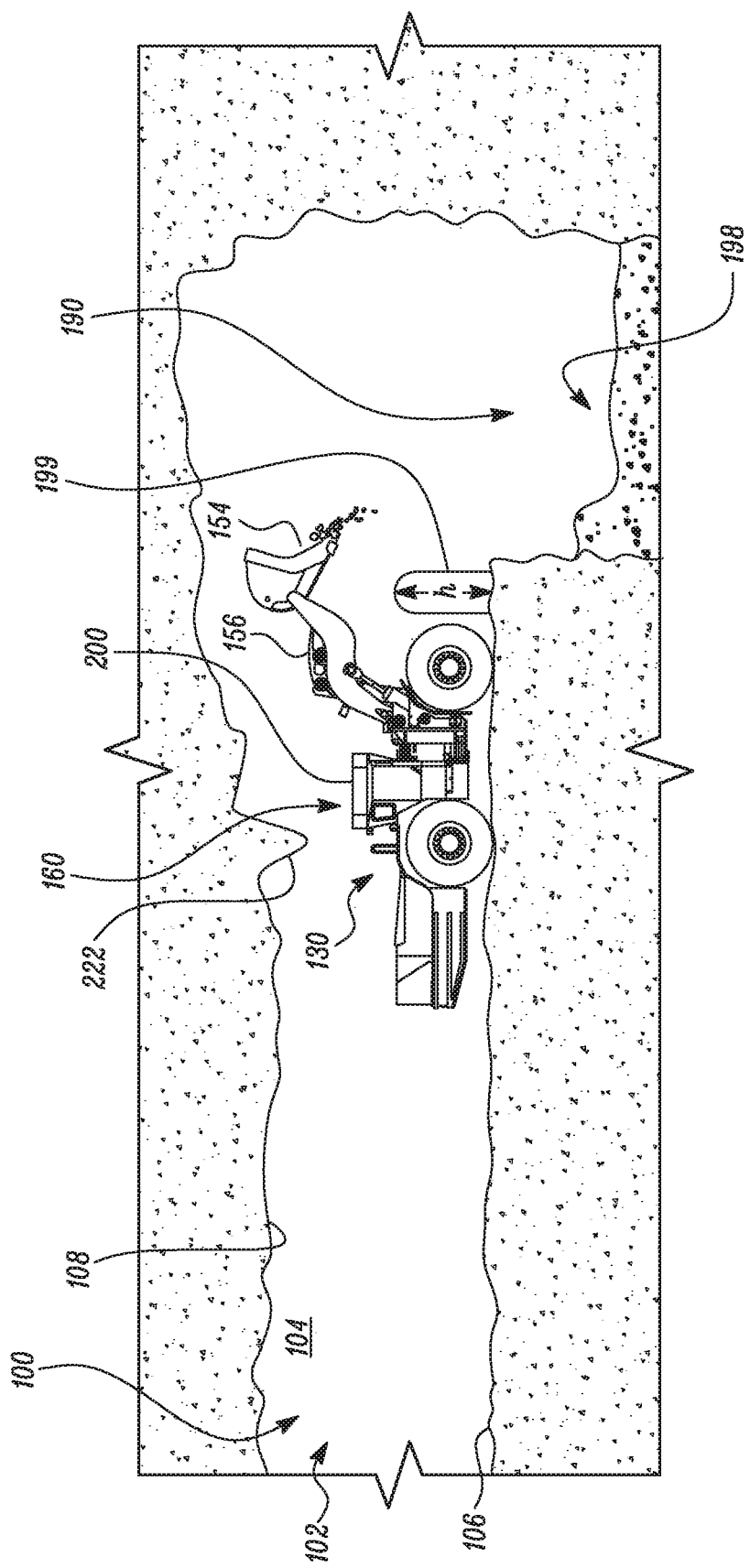
Figure 9A:
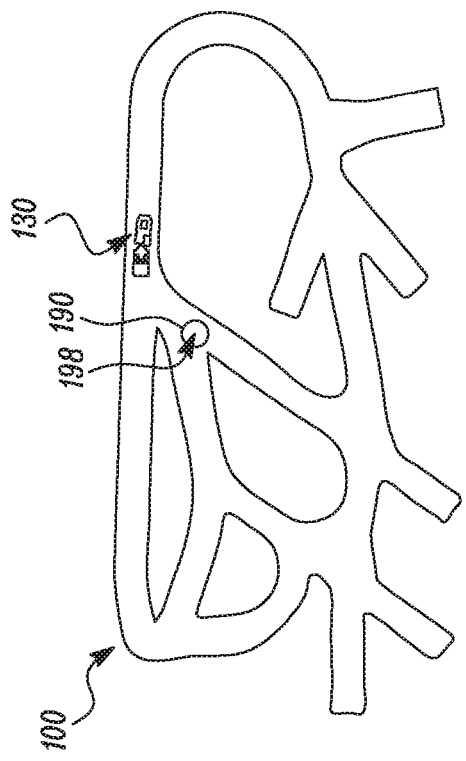
FIG. 9 illustrates a digital rendition of the worksite with the machine working therein (FIG. 9A, FIG. 9B, FIG. 9C and FIG. 9D corresponding to FIG. 5, FIG. 6, FIGS. 7 and FIG. 8, respectively), in accordance with an embodiment of the present disclosure.
Figure 9B:
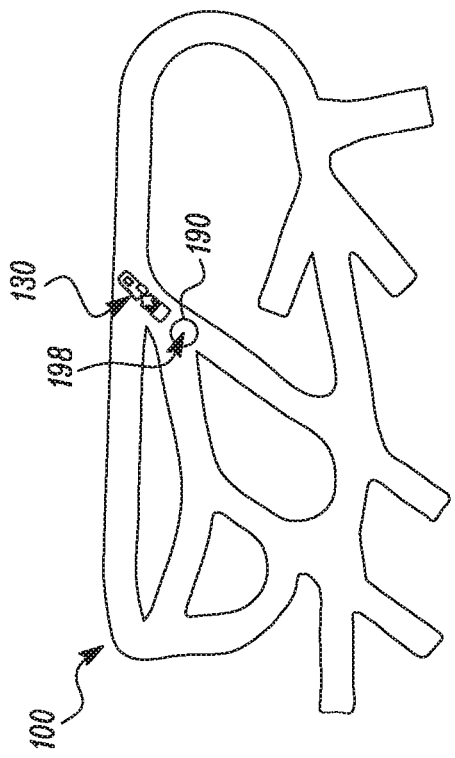
Figure 9C:
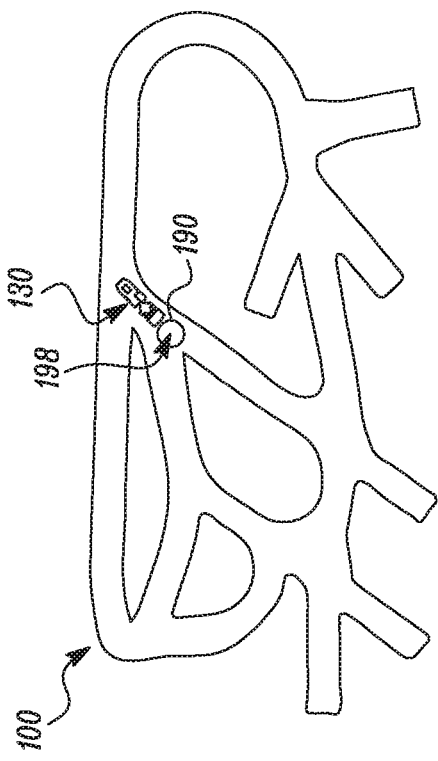
Figure 9D:
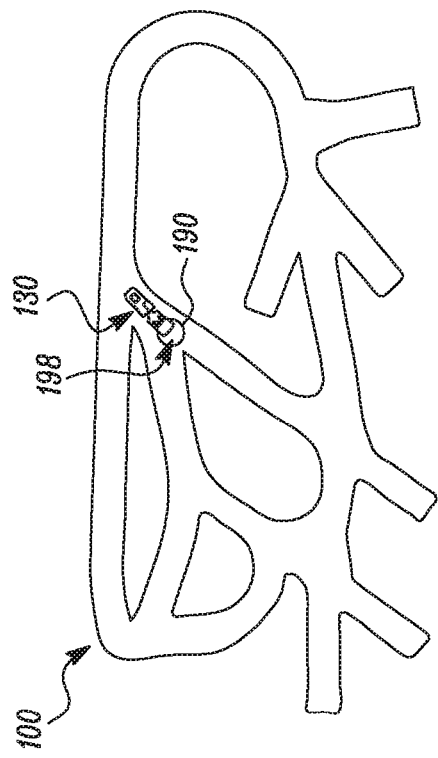
Figure 10:
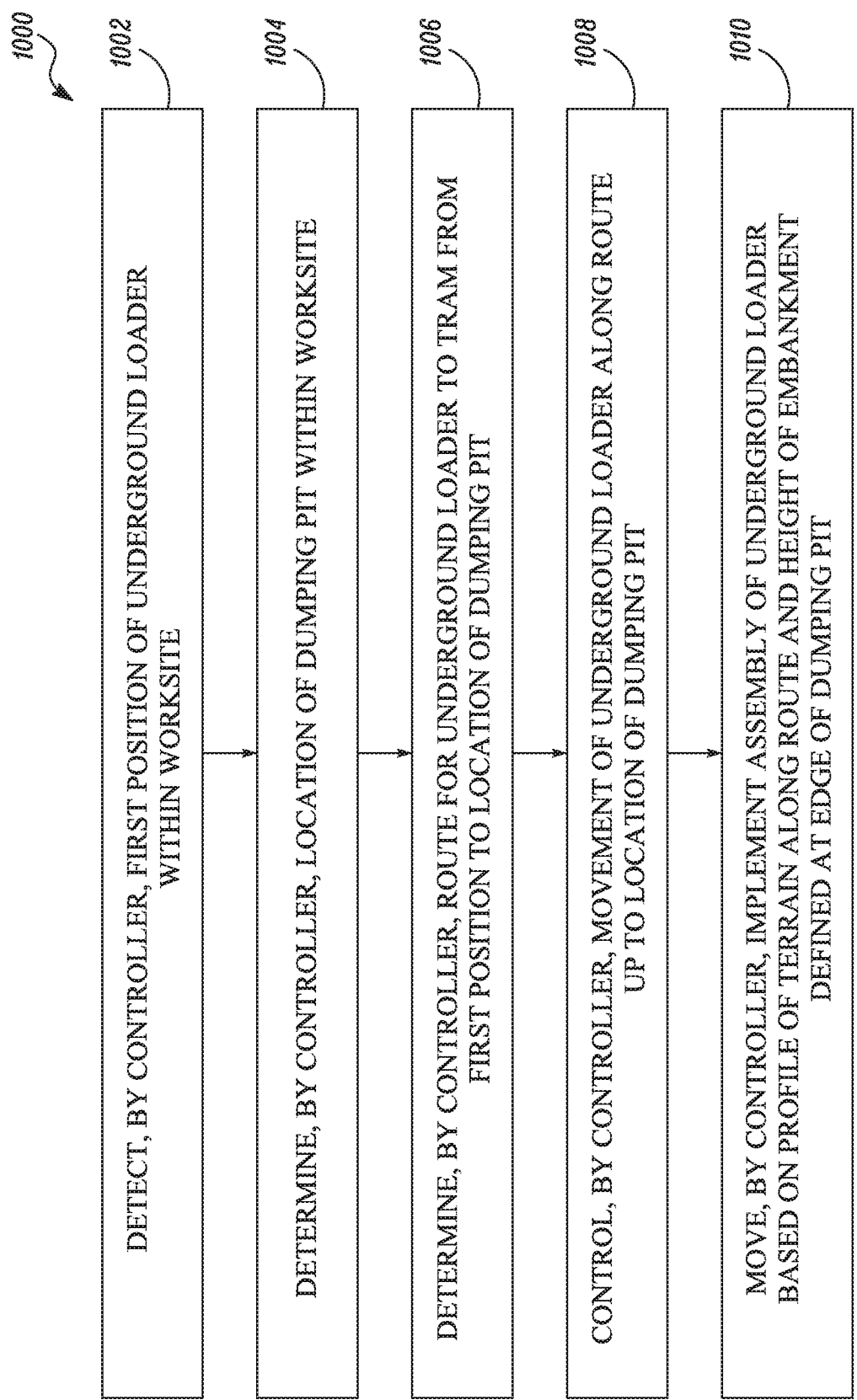
FIG. 10 depicts a method of operating the machine, in accordance with an embodiment of the present disclosure.

In another aspect of the present disclosure, the controller 170 may further be configured to control the implement assembly 146 to facilitate dumping of material accumulated within the implement 154 into the dumping pit 198, as shown in FIG. 8. More specifically, the controller 170 may be configured to actuate the linkage assembly 156 such that a pivoting action of the implement 154 takes place. Therefore, leading to dumping of the material within the implement 154 into the dumping pit 198.

Figure 7B:
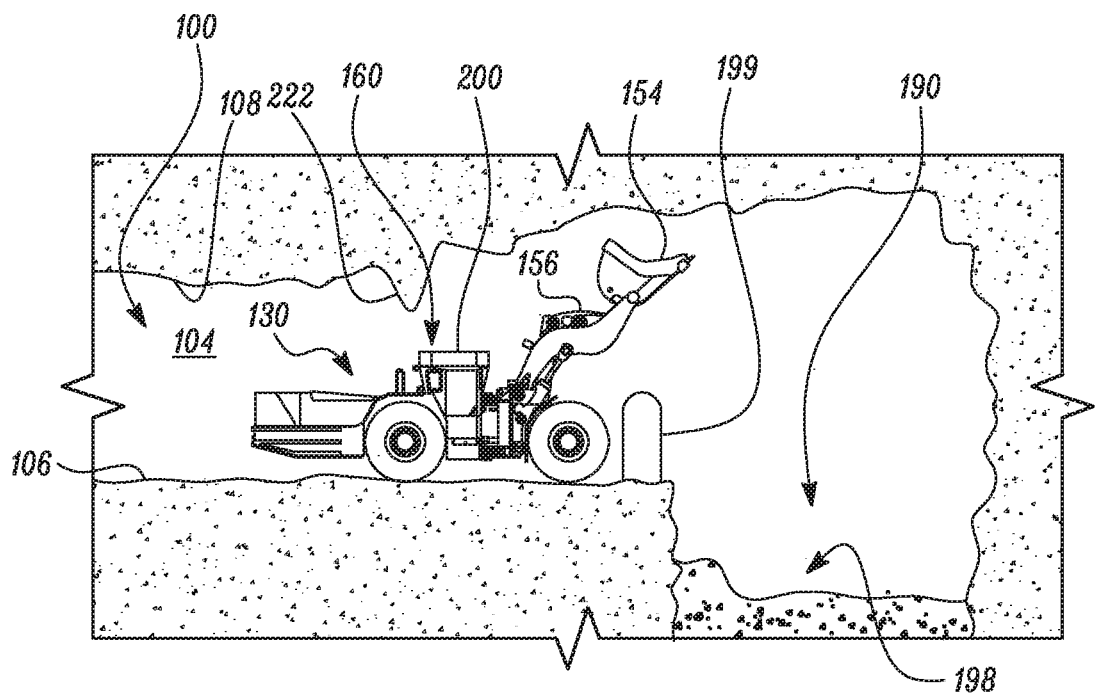

In an aspect of the present disclosure, the dumping of the material within the implement 154 into the dumping pit 198 further includes determining by the sensor 158 (as disclosed above) the mass of the material accumulated within the implement 154 in a first implement position i.e. position of the implement 154 when the machine 130 is halted at predefined clearance from the embankment 199, as shown in FIG. 7B. The controller 170 is then configured to actuate the linkage assembly 156 to move the implement 154 to a dumping position i.e. a position where the material accumulated within the implement 154 exits in view of gravity, as shown in FIG. 8. The controller 170 is then further configured to pivot the implement 154 (via the linkage assembly 156) to the first implement position and back to the dumping position (to facilitate pivoting action of the implement 154) for dumping the material still accumulated within the implement 154. This process of pivoting the implement 154 is continued until the mass determined by the sensor 158 is equal to the mass of the implement 154 devoid of any material therein. In an embodiment, the dumping of the material within the implement 154 into the dumping pit 198 may include moving, by the controller 170, the implement 154 between the dumping position and the first implement position for a predetermined number of times. More specifically, in an embodiment, the pre-determined number of times may be stored in the memory of the controller 170. Let us assume in an exemplary scenario the pre-determined number of times is 5. The controller 170 may move the implement 154 between the dumping position and the first implement position 5 times (no matter what the volume or mass of material within the implement 154 may be). In another embodiment, different values of predetermined number of times corresponding to different scenarios may be stored within the memory of the controller 170. For example, the predetermined number of times may be 4 when the sensor 158 detects the mass of material within the implement 154 is 100 Kgs, 5 when the sensor 158 detects the mass of material within the implement 154 is 130 Kgs, 6 when the sensor 158 detects the mass of material within the implement 154 is 170 Kgs and so on. In such a configuration, the controller 170 may determine the mass of the material within the implement 154 and then based on the determined mass, the controller 170 moves the implement 154 between the dumping position and the first implement position the desired number of times. For example, if the mass of material within the implement is detected as 130 Kgs, the controller 170 may move the implement 154 between the dumping position and the first implement position 5 times.

In another aspect of the present disclosure, the controller 170 may further be configured to move the machine 130 away from the embankment 199 after dumping the material into the dumping pit 198. This can be envisioned by viewing FIG. 8 as the dumping operation and FIG. 7 as the machine 130 moving away from the embankment 199. The controller 170 may further be configured to operate the implement assembly 146 to move the implement 154 of the implement assembly 146 to a tramming position (lowered position), as shown in FIG. 5. The controller 170 may further be configured to move the machine 130 back to the first position 180.

In an aspect of the present disclosure, the controller 170 may be configured to detect any changes to the terrain 102 along route 192 while the machine 130 is tramming from the first position 180 to the location 190 of the dumping pit 198. For the purpose of better understanding of the ongoing disclosure, let us assume that the machine 130 has a second perception system. In this scenario, while the controller 170 uses the perception system 160 to determine the route 192 and move the implement assembly 146, the second perception system may be configured to detect the changes to the terrain 102 along the route 192 by a second machine or another system. This information may be relayed to the controller 170 by the second perception system. The simulation may now be performed again based on the updated information from the second perception system. The simulation may determine different collision scenarios. Accordingly, the controller 170 may now be configured to modify the movement of the implement assembly 146 based on the updated simulation results. Alternatively, the machine 130 may be operated in real time based on the updated/modified terrain 102.

Such method 1000 and control system 200 prevents the operator from performing the same operation over and over again. Thus, obviating a human operator from maintaining a high level of performance and operation of the underground loader/machine 130. Thereby, reducing operator stress levels. Furthermore, elimination of the human operator for performing the dumping operation and automating the machine 130 results in an improvement in the operational efficiency and allows the operator to focus on planning more effective operations, further incrementing the efficiency.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A method for operating an underground loader having an implement assembly that includes a bucket and a linkage assembly, the method comprising:
   detecting, by a controller, a first position of the underground loader within a worksite, the worksite including a terrain and the terrain including a sidewall, a ceiling, and a ground surface;
   determining, by the controller, a location of a dumping pit within the worksite, the dumping pit defined by a bore having a bore ceiling;
   determining, by the controller, a route for the underground loader to tram through the terrain from the first position to the location of the dumping pit,
   controlling, by the controller, a movement of the underground loader along the route through the terrain and to the edge of the dumping pit;
   actuating, by the controller, a perception system of the underground loader to determine the three-dimensional geometrical parameters of a bore sidewall, bore ceiling, and bore ground of the bore;

determining, by the controller, a position and a height of an embankment located at the edge of the dumping pit from the determined three-dimensional geometrical parameters;

determining, by the controller, a dumping position below the bore ceiling and above the height of the embankment that would prevent collision of the bucket with the embankment and bore ceiling as the underground loader approaches the embankment at the edge of the dumping pit; and automatically vertically moving, by the controller, the bucket with the linkage assembly to the dumping position as the underground loader approaches the dumping pit, the controller configured to avoid collision of the bucket and the ceiling of the terrain as the bucket is vertically moved when approaching the dumping pit, upon the bucket entering the bore of the dumping pit, raise the bucket to the dumping position, and actuate the linkage system to dump the bucket into the dumping pit after the bucket is vertically moved to the dumping position.

2. The method as claimed in claim 1, wherein moving the implement assembly includes:

manipulating, by the controller, the implement assembly as the underground loader moves along the route based on the position of the embankment and the height of the embankment defined at the edge of the dumping pit.

3. The method as claimed in claim 1, wherein moving the implement assembly includes:

determining, by the controller, the profile of the sidewall, and the profile of the ceiling;

manipulating, by the controller, the implement assembly as the underground loader approaches the dumping pit based on the profile of the sidewall, and the profile of the ceiling.

4. The method as claimed in claim 1, wherein moving the implement assembly includes maintaining, by the controller, at least a predefined distance between the terrain and the implement assembly while traversal of the underground loader along the route.

5. The method as claimed in claim 2, further comprising:
stopping, by the controller, the underground loader at a predefined clearance from the embankment.

6. The method as claimed in claim 5, further comprising:
controlling, by the controller, the implement assembly to facilitate dumping of material from the implement assembly into the dumping pit;
moving, by the controller, the underground loader away from the embankment;
operating, by the controller, the implement assembly to move the bucket of the implement assembly to a tramming position; and
moving the underground loader, by the controller, back to the first position.

7. The method as claimed in claim 1, further comprising:
moving the implement between the dumping position and a first implement position a pre-determined number of times to ensure all material is dumped from the implement into the dumping pit.

8. The method as claimed in claim 1, further comprising:
identifying, by a perception system, a protrusion in the sidewall of the terrain along the route while traversal of the underground loader; and
modifying, by the controller, the movement of the implement assembly to avoid collision of the implement assembly with the protrusion while traversal of the underground loader along the route.

9. The method as claimed in claim 1, wherein determining the location of the dumping pit within the worksite includes:
generating, by a perception system, a perception data of the worksite; and
determining, by the controller, based on the perception data, a 2D (2 dimensional) point cloud of the worksite.

10. A control system for operating an underground loader having an implement assembly that includes a bucket and a linkage assembly at a worksite, the worksite having a terrain, and a dumping pit, the terrain having a sidewall, a ceiling, and a ground surface:

a positioning system configured to generate a positional data of the underground loader within the worksite;
a controller communicably coupled to the positioning system and configured to:
detect a first position of the underground loader based on the positional data of the underground loader;
determine a location of the dumping pit within the worksite, the dumping pit defined by a bore having a bore celling;
determine a route for the underground loader to tram through the terrain from the first position to the location of the dumping pit;
control a movement of the underground loader along the route through the terrain and to the edge of the dumping pit;
actuate a perception system of the underground loader to determine the three-dimensional geometrical parameters of a bore sidewall, bore ceiling, and bore ground of the bore;
determine a position and a height of an embankment located at the edge of the dumping pit from the determined three-dimensional geometrical parameters;
determine a dumping position below the bore ceiling and above the height of the embankment that would prevent collision of the bucket with the embankment and bore ceiling as the underground loader approaches the embankment at the edge of the dumping pit; and
automatically vertically move the bucket with the linkage assembly to the dumping position as the underground loader approaches the dumping pit, the controller configured to avoid collision of the bucket and the ceiling of the terrain as the bucket is vertically moved when approaching the dumping pit, upon the bucket entering the bore of the dumping pit, raise the bucket to the dumping position, and actuate the linkage system to dump the bucket into the dumping pit after the bucket is vertically moved to the dumping position.

11. The control system as claimed in claim 10, wherein the controller is configured to maintain at least a predefined distance between the terrain and the implement assembly while traversal of the underground loader along the route.

12. The control system as claimed in claim 10, wherein the controller is further configured to:
manipulate the implement assembly as the underground loader moves along the route based on the position of the embankment and the profile of the terrain.

13. The control system as claimed in claim 12 wherein the controller is configured to stop the underground loader at a predefined clearance from the embankment.

14. The control system as claimed in claim 10 wherein the controller is configured to control the implement assembly to facilitate dumping of a material from the implement assembly into the dumping pit.

15. The control system as claimed in claim 14 wherein the controller is configured to:
- move the underground loader away from an embankment at the dumping pit,
- operate the implement assembly to a tramming position, and
- move the underground loader back to the first position.

16. The control system as claimed in claim 15 wherein the controller is configured to:
- move the implement to the dumping position to dump the material; and
- move the implement between the dumping position and a first implement position a pre-determined number of times to ensure all material is dumped from the implement into the dumping pit.

17. An underground loader operating at a mining site, the mining site having a terrain and a dumping pit, the terrain including a sidewall, a ceiling, and a ground surface, the underground loader including:
- an implement assembly comprising a bucket and a linkage assembly;
- a positioning system configured to generate a positional data of the underground loader within the mining site;
- a controller communicably coupled to the positioning system and configured to:
  - detect a first position of the underground loader based on the positional data of the underground loader;
  - determine a location of the dumping pit within the mining site, the dumping pit defined by a bore having a bore ceiling;
  - determine a route for the underground loader to tram through the terrain from the first position to the location of the dumping pit;
  - control a movement of the underground loader along the route through the terrain and to the edge of the dumping pit;
  - actuate a perception system of the underground loader to determine the three-dimensional geometrical parameters of a bore sidewall, bore ceiling, and bore ground of the bore;
  - determine a position and a height of an embankment located at the edge of the dumping pit from the determined three-dimensional geometrical parameters;
  - determine a dumping position below the bore ceiling and above the height of the embankment that would prevent collision with the bucket and the embankment as the underground loader approaches the embankment at the edge of the dumping pit; and
  - automatically vertically moving the bucket with the linkage assembly to the dumping position as the underground loader approaches the dumping pit, the controller configured to avoid collision of the bucket and the ceiling of the terrain as the bucket is vertically moved when approaching the dumping pit, upon the bucket entering the bore of the dumping pit, raise the bucket to the dumping position, and actuate the linkage system to dump the bucket into the dumping pit after the bucket is vertically moved to the dumping position.

18. The underground loader as claimed in claim 17, wherein the controller is configured to stop the underground loader at a predefined clearance from an embankment.

19. The underground loader as claimed in claim 17 wherein the controller is configured to:
- control the implement assembly to facilitate dumping of material from the implement assembly into the dumping pit;
- move the underground loader away from the embankment;
- operate the implement assembly to a tramming position; and
- move the underground loader back to the first position.

20. The underground loader as claimed in claim 17 wherein the controller is configured to:
- move the implement to the dumping position to dump the material; and
- move the implement between the dumping position and a first implement position a pre-determined number of times to ensure all material is dumped from the implement into the dumping pit.

* * * * *